(12) United States Patent
Simon

(10) Patent No.: US 6,178,041 B1
(45) Date of Patent: Jan. 23, 2001

(54) DEVICE FOR COUPLING THE RADIATION OF SHORT-PULSE LASERS IN AN OPTICAL BEAM PATH OF A MICROSCOPE

(75) Inventor: Ulrich Simon, Jena (DE)

(73) Assignee: Carl Zeiss Jena GmbH, Jena (DE)

( * ) Notice: Under 35 U.S.C. 154(b), the term of this patent shall be extended for 0 days.

(21) Appl. No.: 08/826,906

(22) Filed: Apr. 9, 1997

(30) Foreign Application Priority Data

Jun. 4, 1996 (DE) ............................................ 196 22 359

(51) Int. Cl.[7] .............................. G02B 21/06; G02B 6/26
(52) U.S. Cl. ............................ 359/368; 359/385; 385/31; 385/37
(58) Field of Search .................................... 359/368–369, 359/385–389; 385/31–37, 147, 123; 372/5–6, 100, 102; 356/318, 326; 250/458.1, 459.1, 461.1

(56) References Cited

U.S. PATENT DOCUMENTS

| | | | |
|---|---|---|---|
| 3,741,622 | * 6/1973 | Cox | 359/432 |
| 4,127,828 | * 11/1978 | Klauminzer | 359/837 |
| 4,255,718 | * 3/1981 | Herbst | 372/100 |
| 4,685,107 | * 8/1987 | Kafka et al. | 372/5 |
| 5,034,613 | * 7/1991 | Denk et al. | 356/318 |
| 5,101,456 | * 3/1992 | Islam | 385/37 |
| 5,119,385 | * 6/1992 | Aoshima et al. | 385/123 |
| 5,132,526 | * 7/1992 | Iwasaki | 359/368 |
| 5,161,053 | * 11/1992 | Dabbs | 359/384 |
| 5,202,744 | * 4/1993 | Louis | 359/502 |
| 5,258,989 | * 11/1993 | Raven | 372/6 |
| 5,687,264 | * 11/1997 | Sweatt | 359/565 |
| 5,862,287 | * 1/1999 | Stock et al. | 385/123 |
| 5,995,281 | * 11/1999 | Simon et al. | 359/385 |

\* cited by examiner

Primary Examiner—Thong Nguyen
(74) Attorney, Agent, or Firm—Reed Smith LLP

(57) ABSTRACT

A device for coupling the radiation from short-pulse lasers into a beam path of a microscope, wherein the coupling in is effected by means of at least one light-conducting fiber following the laser, preferably in a confocal beam path, and the end of the fiber is imaged on an object, and an optical arrangement is provided between the laser and light-conducting fiber for changing the laser pulses with respect to time in a wavelength-dependent manner.

23 Claims, 4 Drawing Sheets

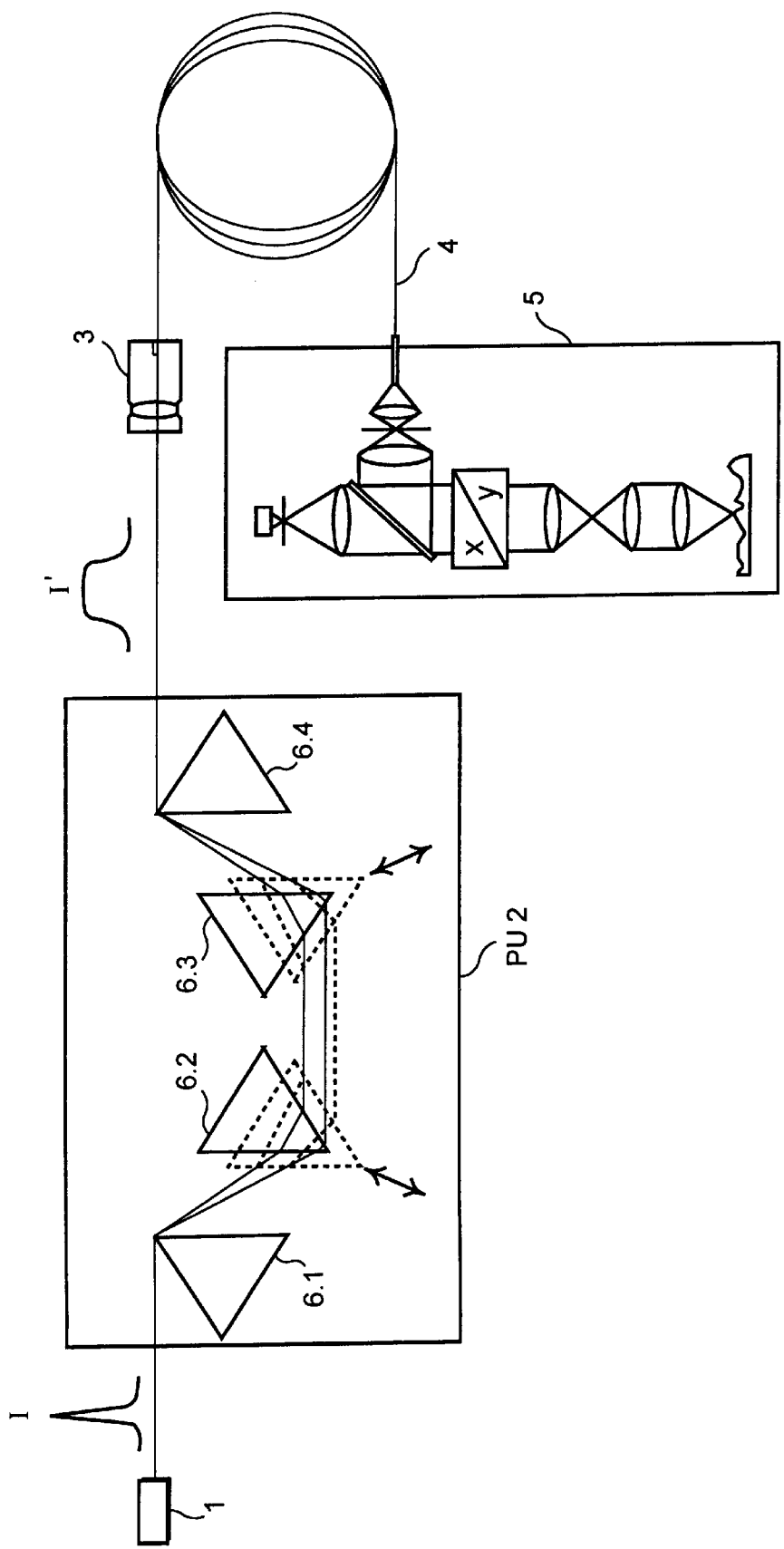
F I G. 2

DEVICE FOR COUPLING THE RADIATION OF SHORT-PULSE LASERS IN AN OPTICAL BEAM PATH OF A MICROSCOPE

BACKGROUND OF THE INVENTION a) Field of the Invention

The invention relates to the coupling in of radiation from a short-pulse laser into an optical beam path of a confocal microscope, preferably in the optical arrangement of a laser scanning microscope.

b) Description of the Related Art

The use of short-pulse lasers in two-photon laser microscopy is known from U.S. Pat. No. 5,034,613. The coupling of light from a laser light source into a confocal scanning beam path via light-conducting fibers is known, per se, from U.S. Pat. No. 5,161,053.

Generally, short pulses undergo a lengthening of their pulse duration when passing through dispersive media due to the phenomenon of group velocity dispersion (GVD). In addition, nonlinear optical phenomena such as self-pulse modulation, Brillouin scattering, Raman scattering, etc. which affect the spectral composition of short pulses can have practical relevance due to the high pulse-crest outputs and intensities which go along with short pulses.

It is suggested in "Handbook of biological confocal microscopy", pages 447, 448, to compensate for the GVD in optical glass by means of prism arrangements or grating arrangements. However, it is questionable whether this brings about any improvement in view of the complex adjustment problems and wasted energy.

OBJECT AND SUMMARY OF THE INVENTION

The primary object of the present invention is an advantageous coupling of short-pulse lasers into the confocal beam path, e.g., in two-photon microscopy.

The invention is directed in particular and in an advantageous manner to the coupling in of short-pulse lasers (picoseconds to femtoseconds pulse durations) in a laser scanning microscope by means of light-conducting fibers.

The invention will be described more fully hereinafter with reference to the schematic drawings.

BRIEF DESCRIPTION OF THE DRAWINGS

In the drawings:

FIG. 2 shows coupling in via a plurality of prisms;

DESCRIPTION OF THE PREFERRED EMBODIMENTS

It is possible to use short-pulse lasers as an excitation source, preferably in two-photon microscopy and time-resolved and spatially-resolved microscopy, wherein these techniques benefit from all of the advantages of fiber coupling such as high flexibility in optical design, highly stable laser beam direction, and good laser beam quality, particularly for coupling in monomode fiber systems.

In particular, the invention advantageously prepares the pulses before they enter the light-conducting fiber in such a way that the pulse shape and pulse length in the specimen to be examined practically correspond to those at the laser output. In this way, the advantages of using short pulses can be combined with the advantages of using light-conducting fibers. In order to counteract differences in transit time between the various spectral components of the short pulses through the dispersive media (including the light-conducting fiber), an optical device is used which can compensate for the GVD and the high-order dispersion of the optical system overall.

This device provides for a time lead for the slower spectral components of the short pulses by means of shortened optical paths effective for these components. As is shown in the embodiment example, the technical realization of this device can comprise prism arrangements or grating arrangements or a combination of the two, or combinations with reflecting elements. Accordingly, a sufficient amount of negative GVD is applied to the short pulses before entry in the light-conducting fiber, so that they regain their original pulse shape in the specimen after passing through the fiber and the rest of the optical system.

As a result of the negative GVD applied to the pulses by means of a suitable pre-chirping unit at the input of the light-conducting fiber, the short pulses are broadened over time to such an extent that the pulse-crest outputs and intensities within the light-conducting fiber are below the critical values for the occurrence of nonlinear phenomena. Accordingly, it is ensured that the short pulses, although changing their temporal form, will not change in spectral composition while passing through the light-conducting fiber. In an advantageous manner, the "self-phase modulation" described for optical pulse compression in "Laser Spectroscopy", W. Demtröder, Springer-Verlag 1991, pp. 418 ff., will therefore not occur.

Figure 4:
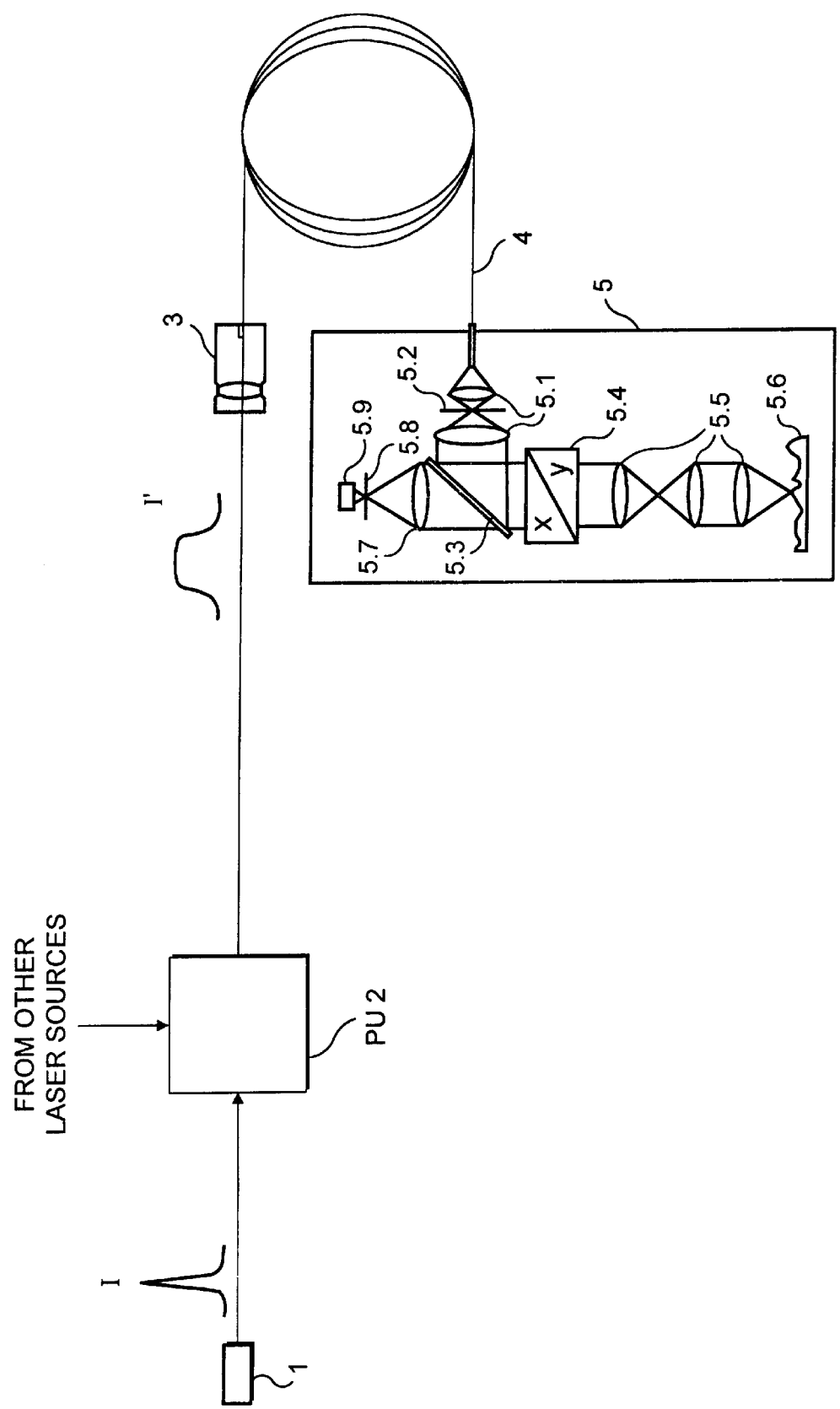
FIG. 4 shows the use of mirrors in block diagram form.

Especially when using monomode light-conducting fibers, the spatial beam profile of the laser radiation in the specimen can be improved over that at the laser output of the excitation laser due to the spatial filtering effect of the fiber. This is particularly advantageous in techniques such as two-photon microscopy, since a clean laser beam profile is a compulsory requirement for good focussing capability of the excitation beam and the high two-photon excitation probability resulting therefrom. Other lasers can also be coupled into the laser scanning microscope simultaneously by means of the same light-conducting fiber used for transmitting the short pulses (see FIG. 4). Combining laser beams into the same light-conducting fiber can be accomplished in various way known in the art. Accordingly, the same object point can be irradiated by a plurality of lasers simultaneously or successively. The use of monomode light-conducting fibers or multimode light-conducting fibers in connection with subsequent diffraction-limited focussing through an aperture for spatial filtering of the excitation laser beam profile in connection with short-pulse lasers enables an improved focussing capability of the excitation laser beam and accordingly a higher spatial resolution and also two-photon excitation probability.

An improvement is achieved in the beam direction stability in connection with short-pulse lasers. In particular, this allows the generally complex and adjustment-intensive short-pulse laser to be optimized without the need for readjustment of the laser scanning microscope. After the short-pulse laser is optimized, it is only necessary to maximize the coupling efficiency in the light-conducting fiber; however, the beam path within the microscope remains unchanged.

Figure 1:
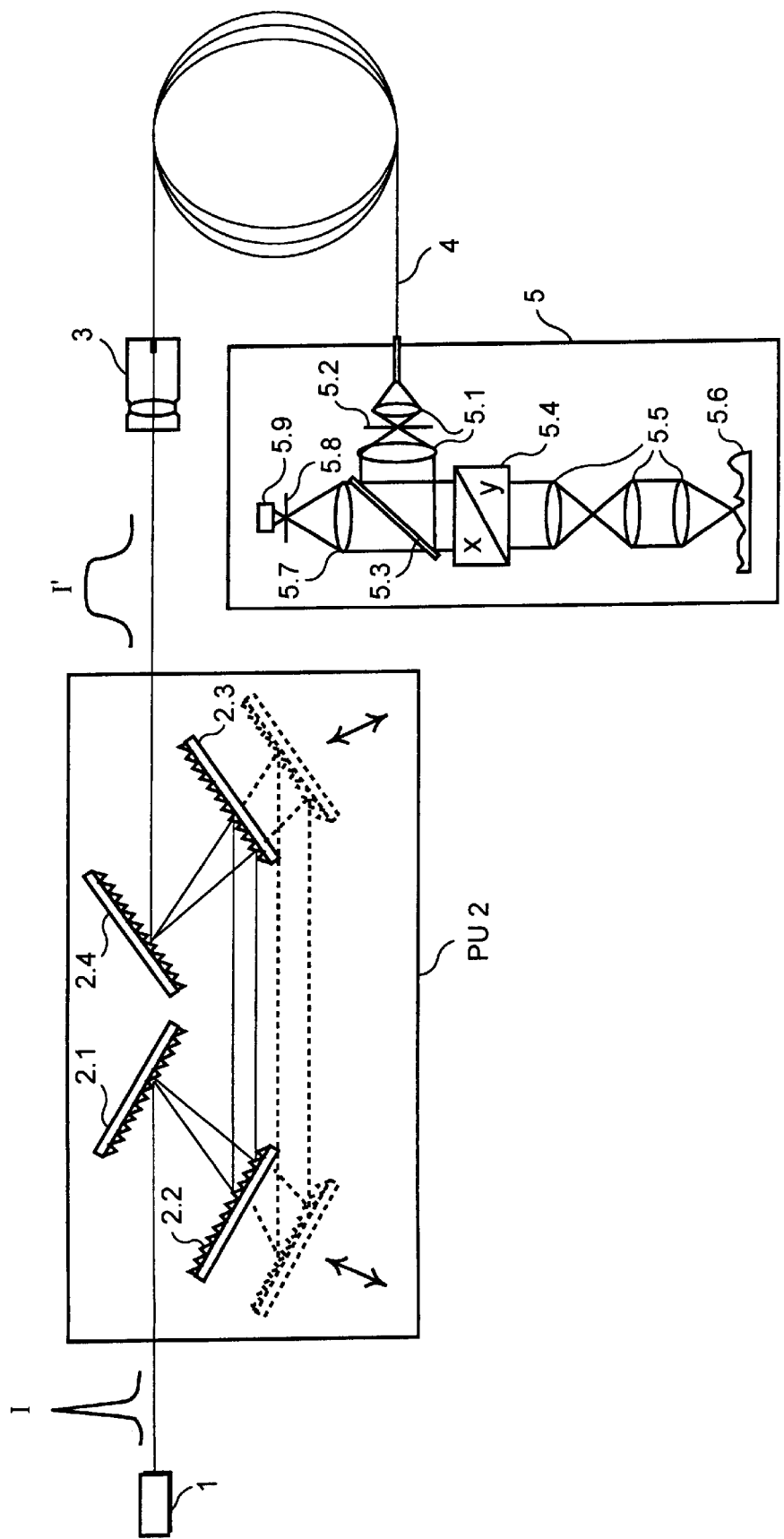
FIG. 1 shows coupling in via a plurality of gratings.

Referring now to the drawings, in FIG. 1, the light from a short-pulse laser light source 1, e.g., a titanium-sapphire laser with pulse durations in the order of magnitude of approximately 100 fs, enters a pre-chirping unit PU 2 which, in the present case, comprises four gratings 2.1, 2.2, 2.3, 2.4. An individual pulse I is shown by way of example. By means of wavelength-dependent diffraction at the first grating 2.1 and after collimation at grating 2.2 and the restoring of the beam ratios with respect to beam diameter and parallelism by means of gratings 2.3, 2.4, the blue light component obtains a lead in time over the red light component. The laser pulses I' which are expanded in time in this way travel via a coupling in element 3 and a monomode fiber 4 in the beam path of a confocal scanning microscope 5 which is indicated schematically by the illustration of coupling out optics 5.1 with pinhole 5.2, semitransparent mirror 5.3, an X/Y scanning unit 5.4, imaging optics 5.5, specimen 5.6, imaging optics 5.7, pinhole 5.8, and detector 5.9.

In FIG. 2, four prisms 6.1, 6.2, 6.3, 6.4 are provided in place of the gratings 2.1–2.4 in the PU 2, these prisms 6.1–6.4 effecting a spectral division analogous to the gratings 2.1–2.4 with subsequent collimation and beam recombination.

Instead of the four gratings or prisms provided here, an arrangement of only two gratings or prisms and a mirror can also be selected, the beam being turned back on its course after reflection at the mirror so that it passes twice through the grating combination or prism combination. Further, a multiple passage through the PU 2 can be effected by using a plurality of mirrors M1, shown in block form in FIG. 4.

Figure 3:
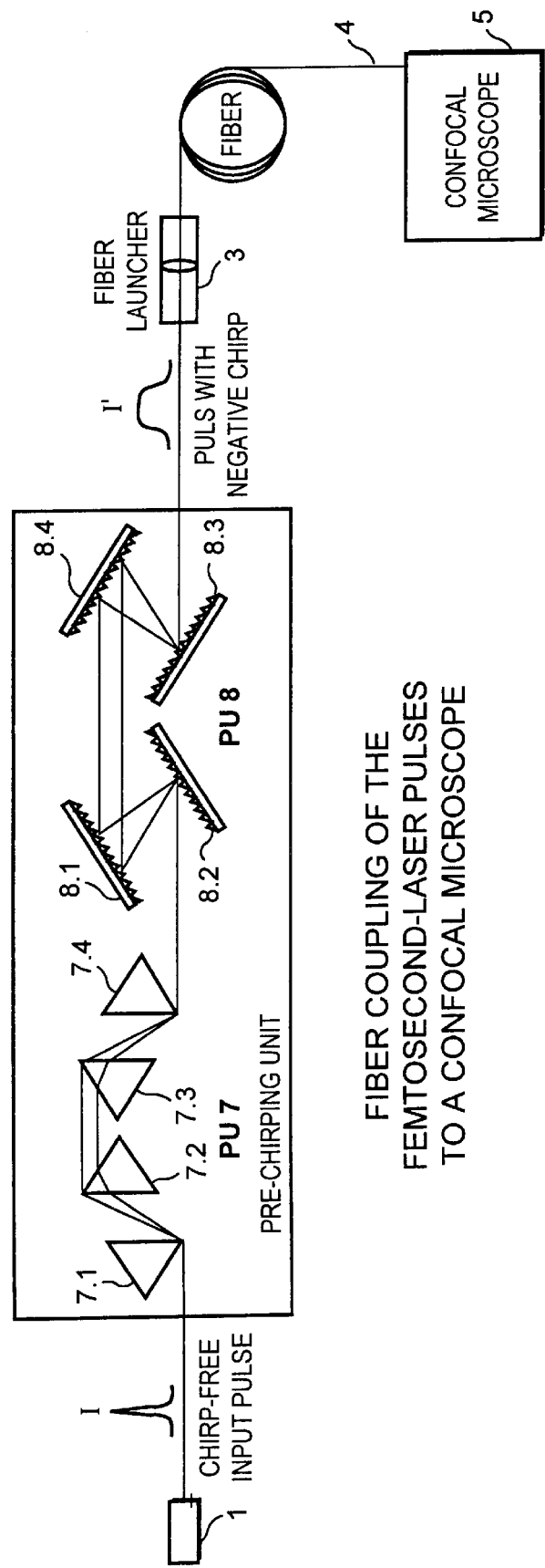
FIG. 3 shows coupling in via gratings and prisms.

In FIG. 3, the aimed for effect is further increased by combining a PU 7 comprising prisms 7.1–7.4 with a PU 8 comprising gratings 8.1–8.4.

Higher-order dispersion effects can also be compensated for in this case in particular as is described with respect to optical pulse compression ("Laser Spectroscopy", W. Demtroder, Springer-Verlag 1991, pp. 418 ff).

By increasing the distance of gratings 2.1, 2.4 from gratings 2.2, 2.3 and the distance of prisms 6.1, 6.4 from prisms 6.2, 6.3 by means of the displacement of elements 2.2; 2.3 and 6.2; 6.3 along the direction indicated by the arrows, as is shown schematically in FIGS. 1 and 2, the spectral path differences are increased in an adjustable manner or are decreased by reducing the distance. A second position of the gratings 2.2; 2.3 and prisms 6.2; 6.3 is shown by way of example in dashed lines.

Accordingly, it is possible to adjust the pulse width so that not only the differences in transit time caused by the light-conducting fiber, but also, beyond this, differences in transit time caused by further dispersive media, especially in the beam path of the confocal microscope, e.g., objectives, especially those with a high numerical aperture, the scanning objective, tube lens, and other optical elements made from glass, can be compensated for in a directed manner.

The displacement of the gratings or prisms along the direction indicated by the arrows can be effected manually or by electrical control by means of known steps familiar to the person skilled in the art and not shown herein.

While the foregoing description and drawings represent the present invention, it will be obvious to those skilled in the art that various changes may be made therein without departing from the true spirit and scope of the present invention.

What is claimed is:

1. A device for coupling radiation in the form of laser pulses supplied from a short-pulse laser into a beam path of a microscope, said device comprising:
    at least one light-conducting fiber following the laser for coupling said laser pulses into said beam path of said microscope; and
    an optical arrangement provided between the laser and said at least one light-conducting fiber, said optical arrangement changing the laser pulses with respect to time in a wavelength-dependent manner.

2. The device according to claim 1, wherein the coupling in is effected in a confocal beam path and an end of the fiber is imaged on an object.

3. The device according to claim 2, wherein the microscope is a laser scanning microscope.

4. The device according to claim 1, wherein the coupling in is effected via at least one monomode fiber.

5. The device according to claim 1, wherein the optical arrangement comprises at least two prisms.

6. The device according to claim 1, wherein the optical arrangement comprises at least two gratings.

7. The device according to claim 1, wherein the optical arrangement comprises a combination of prisms and gratings.

8. The device according to claim 1, wherein the optical arrangement comprises four prisms or gratings.

9. The device according to claim 1, wherein a difference in time between different wavelengths of the laser pulses is adjustable by the optical arrangement.

10. The device according to claim wherein a distance or distances between elements comprising the optical arrangement is adjustable.

11. The device according to claim 10, wherein the optical arrangement comprises prisms or mirrors, and a spacing between the prisms or mirrors of the optical arrangement is adjustable.

12. The device according to claim 1, wherein light from other laser light sources is coupled in via the light-conducting fiber simultaneously or at an offset in time in addition to the radiation supplied from the short-pulse laser.

13. The device according to claim 1, wherein the coupling in is effected in a beam path and an end of the fiber is imaged on an object in a laser scanning microscope.

14. The device according to claim 13, wherein the coupling in is effected via at least one monomode fiber.

15. The device according to claim 13, wherein the optical arrangement comprises at least two prisms.

16. The device according to claim 13, wherein the optical arrangement comprises at least two gratings.

17. The device according to claim 13, wherein the optical arrangement comprises a combination of prisms and gratings.

18. The device according to claim 13, wherein the optical arrangement comprises four prisms or gratings.

19. The device according to claim 13, wherein a difference in time between different wavelengths of the laser pulses is adjustable by the optical arrangement.

20. The device according to claim 19, wherein a spacing between elements of the optical arrangement is adjustable.

21. The device according to claim 20, wherein the optical arrangement comprises prisms or mirrors, and a spacing between the prisms or mirrors of the optical arrangement is adjustable.

22. The device according to claim 13, wherein light from other laser light sources is coupled in via the light-conducting fiber simultaneously or at an offset in time in addition to the radiation of the short-pulse lasers.

23. A method for adjusting a launching unit or coupling in unit for a microscope, comprising the steps of:
    providing prisms and/or gratings for the coupling in unit for coupling radiation of short-pulse lasers into a beam path of a microscope via at least one light-conducting fiber; and
    displacing at least one prism and/or grating of the coupling in unit for adjustment in order to change the laser pulses with respect to time in a wavelength-dependent manner.

* * * * *